United States Patent
Kaufman et al.

(10) Patent No.: US 9,917,429 B2
(45) Date of Patent: Mar. 13, 2018

(54) POWER DISTRIBUTION HOUSING

(71) Applicant: Littelfuse, Inc., Chicago, IL (US)

(72) Inventors: Justin Kaufman, Bellingham, WA (US); Brent Glad, Bellingham, WA (US)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 15/260,527

(22) Filed: Sep. 9, 2016

(65) Prior Publication Data

US 2017/0070041 A1   Mar. 9, 2017

Related U.S. Application Data

(60) Provisional application No. 62/215,823, filed on Sep. 9, 2015.

(51) Int. Cl.
*H02G 3/14* (2006.01)
*H02G 3/08* (2006.01)

(52) U.S. Cl.
CPC .............. *H02G 3/14* (2013.01); *H02G 3/081* (2013.01)

(58) Field of Classification Search
CPC ............ H02G 3/08; H02G 3/081; H02G 3/14; H05K 5/0013; H05K 5/0004; B65D 45/16; B65D 45/22; B65D 45/00; B65D 45/20; B65D 45/02
USPC ....... 220/3.8, 3.94, 4.02, 324, 315; 174/562, 174/561, 560, 559, 520; D13/160, 158, D13/184; 292/256.5, 256, 283, 281
See application file for complete search history.

(56) References Cited

U.S. PATENT DOCUMENTS

| | | | | |
|---|---|---|---|---|
| 2,936,094 A | * | 5/1960 | Smith | H01M 2/1072 220/315 |
| 4,993,585 A | * | 2/1991 | McMahon | A45C 5/02 220/4.22 |
| 5,810,188 A | * | 9/1998 | Novakoski | B65D 43/169 215/237 |

(Continued)

FOREIGN PATENT DOCUMENTS

JP    H08107615 A    4/1996

OTHER PUBLICATIONS

ISR and Written Opinion dated Dec. 5, 2016 in corresponding PCT/US2016/050894.

(Continued)

*Primary Examiner* — Robert J Hicks (57) ABSTRACT

A power distribution housing including a base, a cover adapted to fit onto the base, a latch member adapted to removably secure the cover to the base, the latch member having a first end pivotably connected to the base and a second end having a latch detent extending therefrom, the latch detent configured to engage a catch in the cover when the latch member is pivoted to a latched position wherein the cover is secured to the base by the latch member, and a locking member coupled to the latch member, the locking member movable between a locked position, in which a locking member extension of the locking member engages a locking member recess in the cover and prevents the latch member from being moved from the latched position to an unlatched position, and an unlocked position in which the locking member extension does not engage the locking member recess.

20 Claims, 8 Drawing Sheets (56) References Cited

U.S. PATENT DOCUMENTS 6,508,495 B1 * 1/2003 Riley .................. E05C 1/04
220/326

OTHER PUBLICATIONS

Littelfuse, Inc. "MDB Series Sealed Distribution Box Features and Benefits, and Installation Instructions"; You Tube; Video [online]. Apr. 5, 2016 [reterieved Oct. 28, 2016]. <URL:https://www.youtube.com/watch?v=hCVpSt6Vk-w.

Littelfuse, Inc. "MDB Series Sealed Distribution Box Features and Benefits"; You Tube; Video [online]. Apr. 7, 2016 [reterieved Oct. 28, 2016]. <URL:https://www.youtube.com/watch?v=UFvMVeTTfdo>.

60 Way Fuse Holder. Datasheet [online]. Littelfuse, Jul. 31, 2014 [retrieved on Oct. 26, 2016]. <URL:http://www.littelfuse.com/~/media/commercial-wehicle/2d/prints/pdm/littelfuse-pdm-hwb60al-71001zxm-2d-print.pdf>.

New 2_3 Way MIDI Fuse Box. Datasheet [online]. Littelfuse, Mar. 19, 2015 [retrieved on Oct. 26, 2016]. <URL:http://www.littelfuse.com/~/media/commercial-vehicle/2d-prints/fuse-holders/littelfuse-fuse-box-mdb-04980933zxt-2d-print.pdf>; p. 3.

\* cited by examiner

POWER DISTRIBUTION HOUSING

CROSS-REFERENCE TO RELATED APPLICATIONS

The present application claims priority to U.S. Provisional Patent Application No. 62/215,823, filed on Sep. 9, 2015 and titled "Secured Power Distribution Cover Latch," the entirety of which is incorporated by reference herein.

FIELD OF THE DISCLOSURE

Embodiments of the present disclosure relate generally to the field of electrical devices, and more particularly to a power distribution housing having a cover that can be conveniently secured to, and removed from, a base without requiring the use of tools.

BACKGROUND OF THE DISCLOSURE

Power distribution housings, also referred to as "junction boxes," have traditionally been used to house electrical components such as fuse blocks, fuses, relays, and the like. Typically, these electrical components are collectively capable of distributing power in an electrical system to one or more electrical loads, such as a refrigeration unit in a tractor/trailer combination. Mating harness connectors or ring terminals may be plugged into one or more of the electrical components within the housing to enable power distribution to the one or more electrical loads. Exposure of the power distribution housing to adverse environments and weather conditions can damage or destroy electrical components within the housing.

Various power distribution housings have been developed that are intended to protect internal electrical components from adverse external conditions. However, such power distribution housings generally include complex mechanical configurations that require the use of tools to open and close the housings, such as for gaining access to the internal electrical components for service, replacement, adjustment, etc. Requiring the use of tools renders the task of opening and closing a power distribution housing time-consuming and inconvenient.

It is with respect to these and other considerations that the present improvements may be useful.

SUMMARY

This summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An exemplary embodiment of a power distribution housing in accordance with the present disclosure can include a base, a cover adapted to fit onto the base, and a latch member adapted to removably secure the cover to the base, the latch member having a first end pivotably connected to the base and a second end having a latch detent extending therefrom, the latch detent configured to securely engage a catch formed in the cover when the latch member is pivoted to a latched position in which the cover is secured to the base by the latch member.

Another exemplary embodiment of a power distribution housing in accordance with the present disclosure can include a base, a cover adapted to fit onto the base, a latch member adapted to removably secure the cover to the base, the latch member having a first end pivotably connected to the base and a second end having a latch detent extending therefrom, the latch detent configured to securely engage a catch formed in the cover when the latch member is pivoted to a latched position in which the cover is secured to the base by the latch member, and a locking member slidably coupled to the latch member, the locking member movable between a locked position, in which a locking member extension of the locking member engages a locking member recess in the cover and prevents the latch member from being moved from the latched position to an unlatched position, and an unlocked position in which the locking member extension does not engage the locking member recess in the cover.

BRIEF DESCRIPTION OF THE DRAWINGS

By way of example, various embodiments of the disclosed device will now be described, with reference to the accompanying drawings, in which.

DETAILED DESCRIPTION

The present embodiments will now be described more fully hereinafter with reference to the accompanying drawings, in which some embodiments are shown. The subject matter of the present disclosure, however, may be embodied in many different forms and should not be construed as limited to the embodiments set forth herein. Rather, these embodiments are provided so that this disclosure will be thorough and complete, and will fully convey the scope of the subject matter to those skilled in the art. In the drawings, like numbers refer to like elements throughout.

Figure 1:
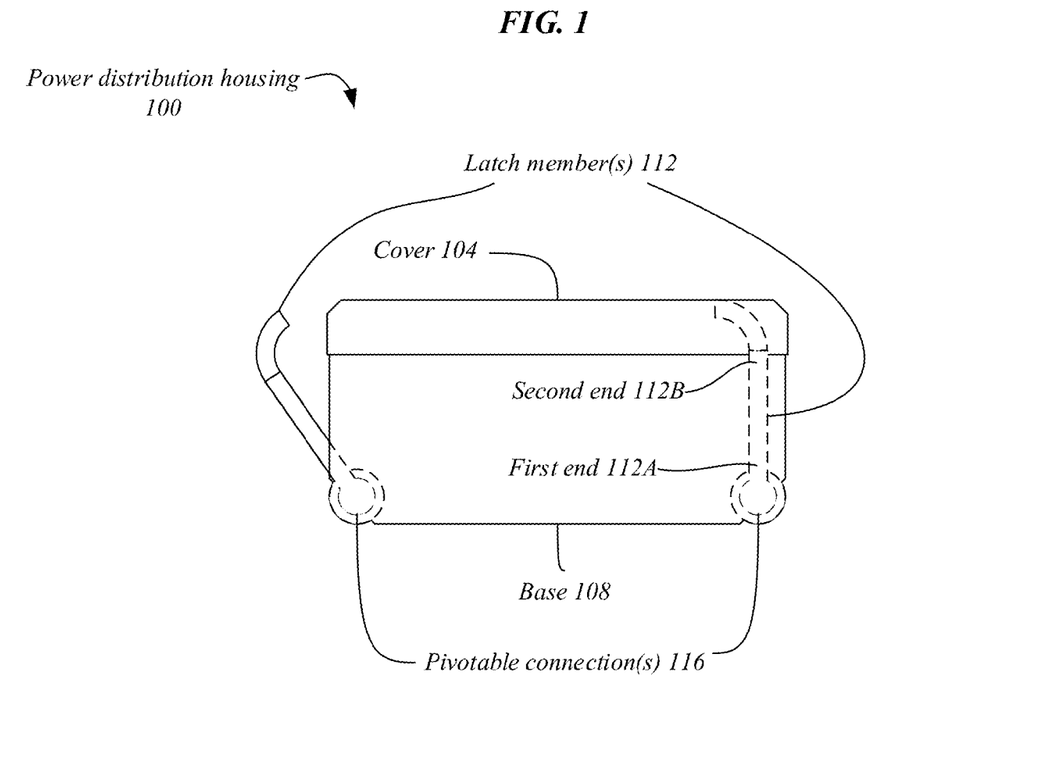
FIG. 1 is a side view of an exemplary power distribution housing in accordance with an embodiment of the present disclosure.

Referring to FIG. 1, a side view of a power distribution housing 100 consistent with a non-limiting, exemplary embodiment of the present disclosure is shown. The power distribution housing 100 can include a cover 104, a base 108, and one or more latch members 112 for removably securing the cover 104 to the base 108 as further described below. Each of the one or more latch members 112 can have a first end 112A that is pivotably connected to the base 108 and a second end 112B that is adapted to extend over or into the cover 104. In some embodiments, one or more of latch members 112 may have a curved geometry. The first end 112A may be connected to the base 108 via one or more pivotable connections 116. The pivotable connections 116 can enable the latch members 112 to rotate relative to the base 108. In some embodiments, the pivotable connections 116 may include pin and bushing sets. Embodiments are not limited in this context.

The cover 104 may be configured to fit over the base 108 in mating engagement therewith and may be secured to the base 108 by the one or more latch members 112. When the cover 104 is secured, or "latched," to the base 108 by the latch members 112, the interior of the power distribution housing 100 may be sealed such that any components within the power distribution housing 100 are effectively protected from adverse environments and weather conditions. The contents of the power distribution housing 100 may include one or more power distribution modules, relays, fuse blocks, fuse holders, disconnect switches, and the like. In some embodiments, an O-ring, gasket or similar sealing member may be compressed between the cover 104 and the base 108 when the cover 104 is secured to the base 108 by the one or more latch members 112.

Figure 2A:
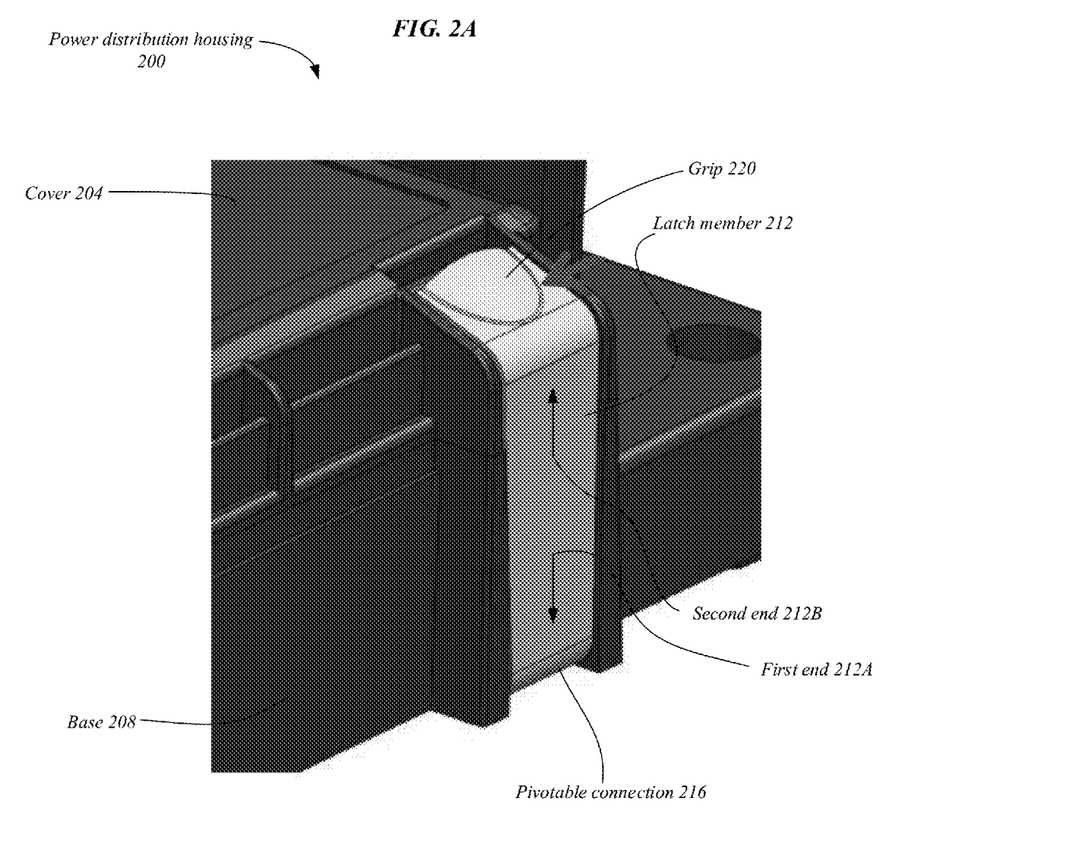
FIG. 2A is an isometric view of an exemplary power distribution housing in accordance with an embodiment of the present disclosure.

Referring now to FIG. 2A, a detail view of a power distribution housing 200 consistent with a non-limiting, exemplary embodiment of the present disclosure is shown. The power distribution housing 200 may be similar to the power distribution housing 100 described above and may include a cover 204, a base 208, and a latch member 212 for securing the cover to the base 208. The latch member 212 can have a first end 212A that is pivotably connected to the base 108 and a second end 212B that is adapted to extend over or into the cover 104. The first end 212A may be connected to the base 208 by a pivotable connection 216. The pivotable connection 216 may be similar to the pivotable connection 116 described above and may enable the latch member 212 to rotate relative to the base 208 in a manner similar to the latch member 112 described above.

The latch member 212 can include a grip 220 proximate the second end 212B. The grip 220 can be configured to enable a user to manually grasp the latch member 112 to facilitate convenient manipulation when latching and un-latching the cover 204 to/from the base 208. For example, the grip 220 may include a raised portion defining an underlying cavity for a user's fingers. In some embodiments, the underlying cavity may include a concave surface. In various embodiments, the grip 220 can provide a user with a mechanical advantage. In various such embodiments, the mechanical advantage may remove the need for tools to un-latch cover 204 from base 208. For instance, an underlying cavity for a user's finger in grip 220 may provide leverage for un-latching cover 204 from base 208. Embodiments are not limited in this context. Not requiring the use of tools to secure/unsecure the cover 204 to/from the base 208 can simplify access to the interior of the power distribution housing 200. As will be described in greater detail below, the latch member 212 may allow a user to conveniently secure the cover 204 to the base 208 and remove the cover 204 from the base 208 without requiring the use of any tools. This may greatly simplify and expedite access to the interior of the power distribution housing 200 (such as for maintenance, reconfiguration of components, etc.) and subsequent re-fastening of the cover 204 to the base 208.

The cover 204, base 208, and latch member 212 can be formed from one or more materials. In various embodiments, the materials may include, but are not limited to, various plastics, metals, composites, polymers, alloys, organic matter, or the like. The materials can be selected to achieve desired properties including rigidity, durability, resilience, electrical insulation, and the like. In the illustrated embodiment, the cover 204 and the base 208 may be formed of a first material and the latch member 212 may be formed of a second material. In some embodiments, the first material can be selected for its rigidity and durability in order to protect the contents of the power distribution housing 200 from adverse conditions such as an impact. The second material can be more resilient than the first material for enabling the latch member 212 to flex and establish "snap-fit" type engagement with the cover 204 as further described below. In some embodiments, different materials can be used for different portions of one or more of the cover 204, base 208, and latch member 212. For example, the latch member 212 may be constructed using a two shot molding process wherein one portion of the latch member 212 is flexible relative to a second portion of the latch member 212. In some embodiments, latch member 212 may have a curved geometry.

Figure 2B:
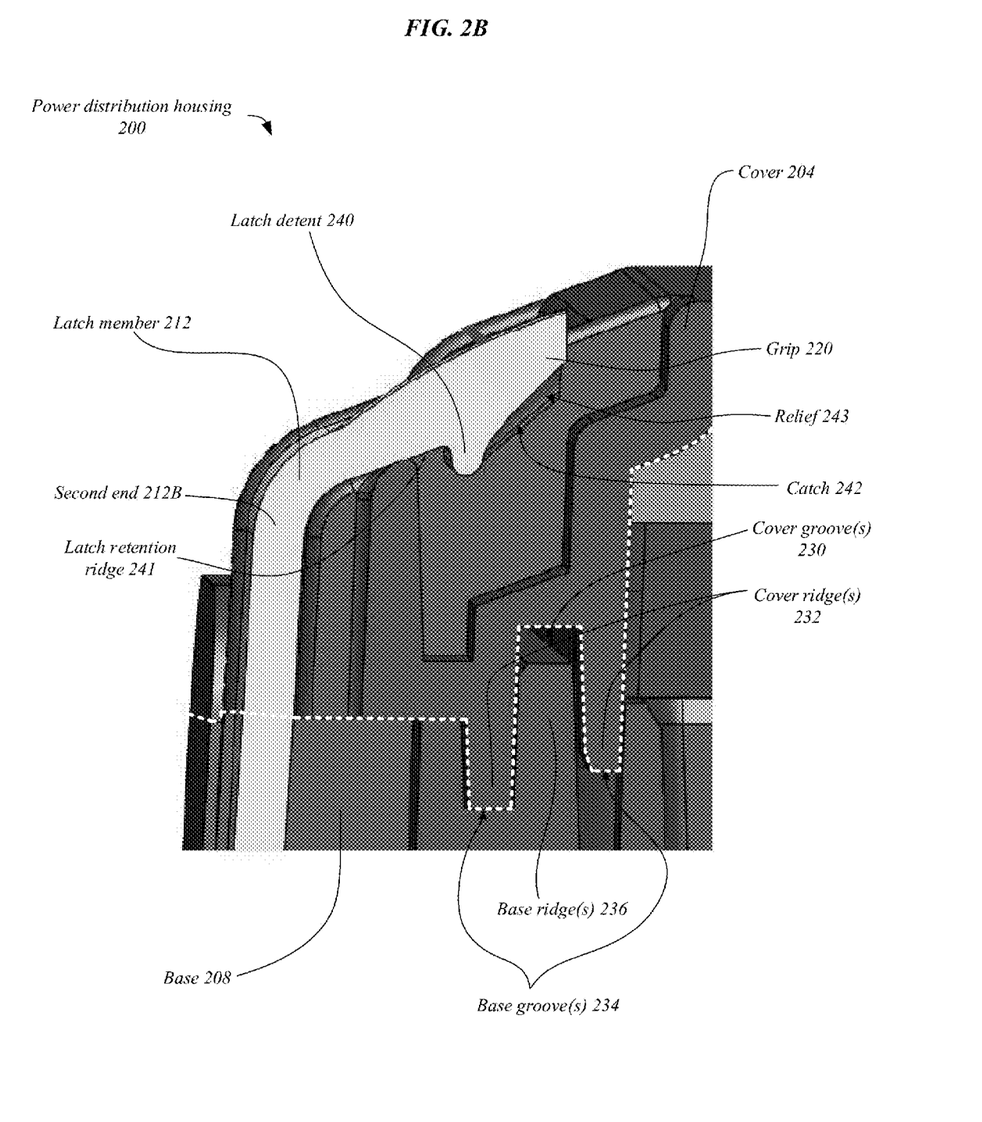
FIG. 2B is a side cut-through view of the exemplary power distribution housing of FIG. 2A in accordance with an embodiment of the present disclosure.

Referring now to FIG. 2B, a side cut-through view of the portion of the power distribution housing 200 illustrated in FIG. 2A is shown. As described above, the power distribution housing 200 may include a cover 204, a base 208, and a latch member 212. The base 208 may include one or more base grooves 234 and/or base ridges 236 adapted to matingly engage one or more corresponding cover grooves 230 and/or cover ridges 232 formed in the cover 204. Engagement of the cover grooves 230 and/or cover ridges 232 with the base grooves 234 and/or ridges 236 may align cover 204 relative to the base 208 in a desired, predefined manner to facilitate proper alignment of the latch member 212 without requirement manual adjustment or repositioning of the cover 204. In some embodiments, one or more O-rings, gaskets, or similar sealing members may be disposed in the base grooves 234 and/or in the cover grooves 230 and may be compressed between the cover 204 and the base 208 when the cover 204 is secured (e.g., latched) to the base 208. The sealing member(s) may prevent the ingress of potentially damaging liquids and/or particulate matter into the power distribution housing 200. Embodiments are not limited in this context.

As shown in FIG. 2B, a latch detent 240 may extend from a lower surface of latch member 212 proximate the grip 220. When the cover 204 is latched to the base 208, the latch detent 240 may be retained within a recess or catch 242 formed in the cover 204 via latch retention ridge 241, resulting in a snap fit engagement there between. For example, when latch member 212 is pivoted toward the locked position, latch member 212 may flex to enable latch detent 240 to clear latch retention ridge 241. When fully pivoted to the locked position, latch detent 240 may clear latch retention ridge 241 and snap into catch 242, as illustrated in FIG. 2B. The grip 220 may include a relief 243 that allows room for finger access below the grip and facilitate convenient removal of the latch detent 240 from the catch 242 by manually gripping and pulling the grip 220.

Figure 3A:
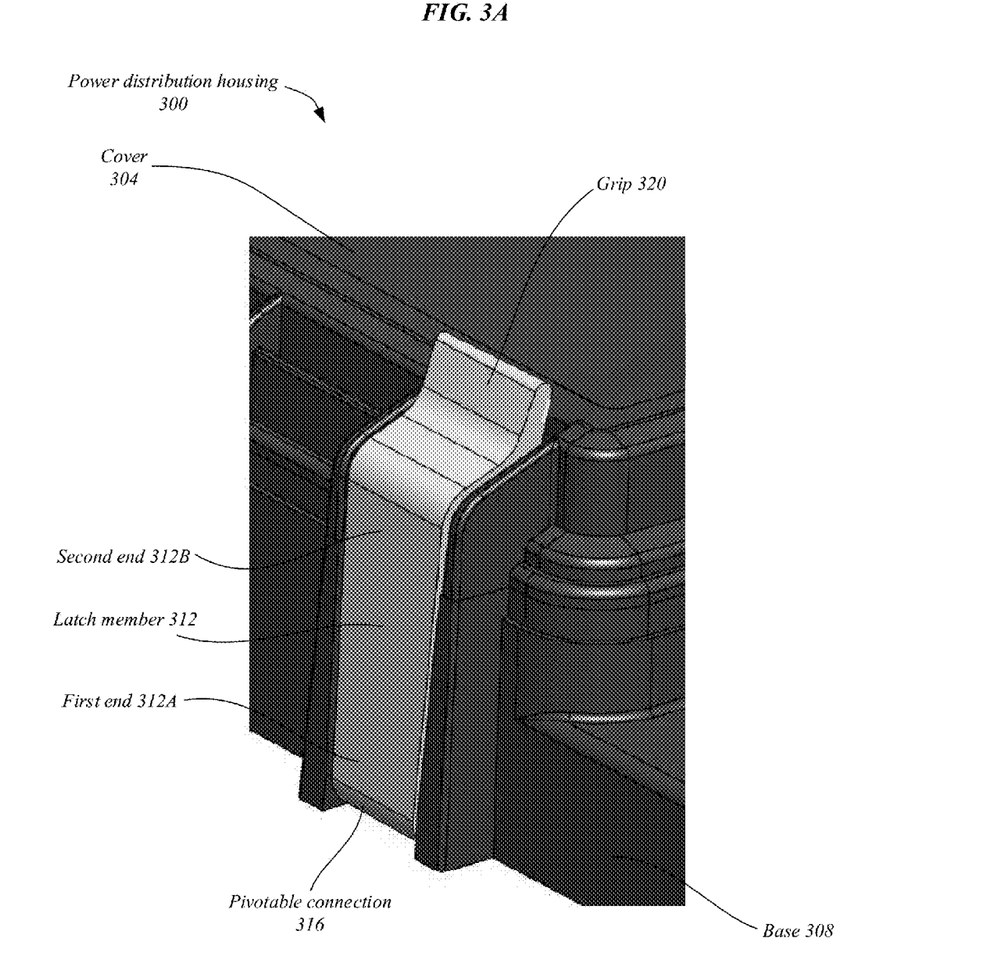
FIG. 3A is an isometric view of an exemplary power distribution housing in accordance with an embodiment of the present disclosure.

Referring now to FIG. 3A, a power distribution housing 300 consistent with a non-limiting, exemplary embodiment of the present disclosure is shown. The power distribution housing 300 may be similar to the power distribution housings 100, 200 described above and may include a cover 304, a base 308, and a latch member 312 for securing the cover 304 to the base 308. The latch member 312 can have a first end 312A and a second end 312B. The first end 312A may be connected to the base 308 by a pivotable connection 316. The pivotable connection 316 may enable the latch member 312 to rotate relative to the base 308. The latch member 312 can be configured to secure the base 308 to the cover 304, thereby protecting any contents of the power distribution housing 300 from hostile environmental conditions. In some embodiments, the latch member 312 may have a curved geometry. The latch member 312 can include a grip 320 proximate the second end 312B. The grip 320 can be configured to enable a user to secure and unsecure the cover 304 to/from the base 308 without the use of tools. Not requiring the use of tools to secure/unsecure the cover 304 to/from the base 308 can simplify access to the interior of the power distribution housing 300. The grip 320 may be configured to increase the contact area accessible to a user attempting to secure and/or unsecure the cover 304 to/from the base 308. In some embodiments, the grip 320 can include one or more curves, lips, flanges, or the like configured to allow the cover 304 to be unsecured from the base 308. Embodiments are not limited in this context.

Figure 3B:
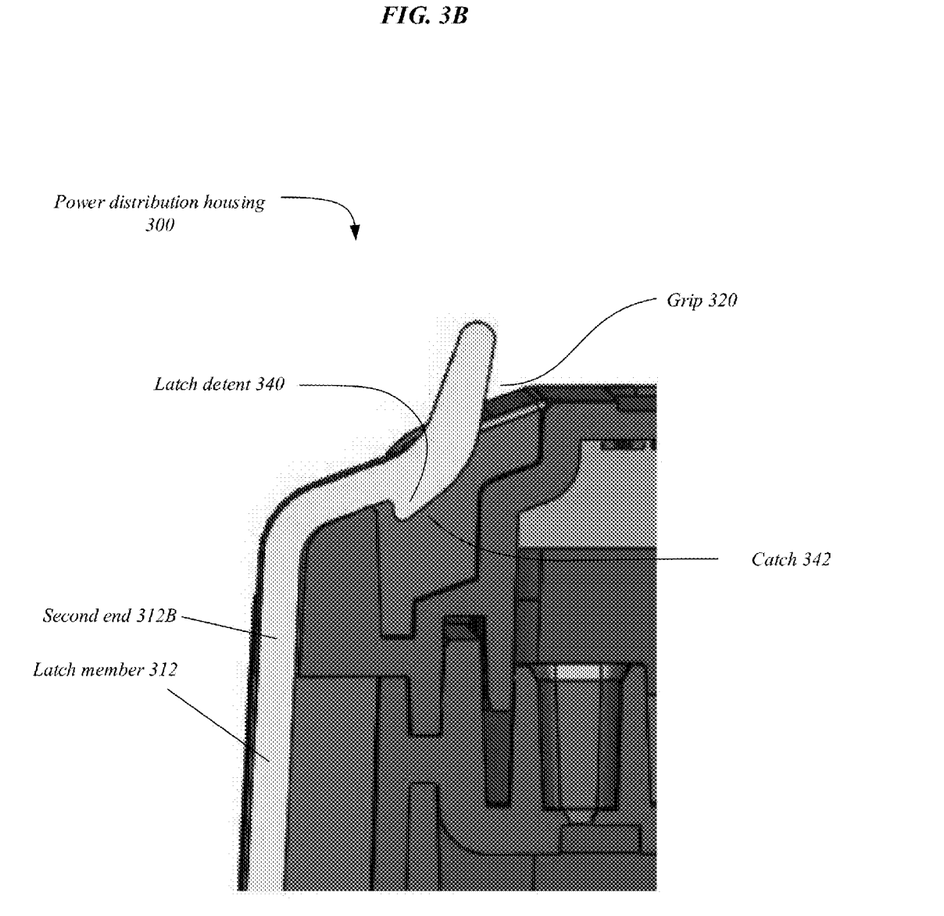
FIG. 3B is a side cut-through view of the exemplary power distribution housing of FIG. 3A in accordance with an embodiment of the present disclosure.

Referring now to FIG. 3B, a side cut-through view of the power distribution housing 300 consistent with a non-limiting, exemplary embodiment of the present disclosure is shown. The power distribution housing 300 may include a cover 304, a base 308, and latch member 312. In the illustrated embodiment, the latch member 312 secures the cover 304 to the base 308 when a latch detent 340 is received by a catch 342. The grip 320 may include an extended rib that allows for more grip room for finger access facilitating easier removal of the latch detent 340 from the catch 342 while still maintaining a high retention force of the cover 304 when it is secured to the base 308. In some embodiments, the grip 320 may include a compound curved surface. Embodiments are not limited in this context.

Figure 4A:
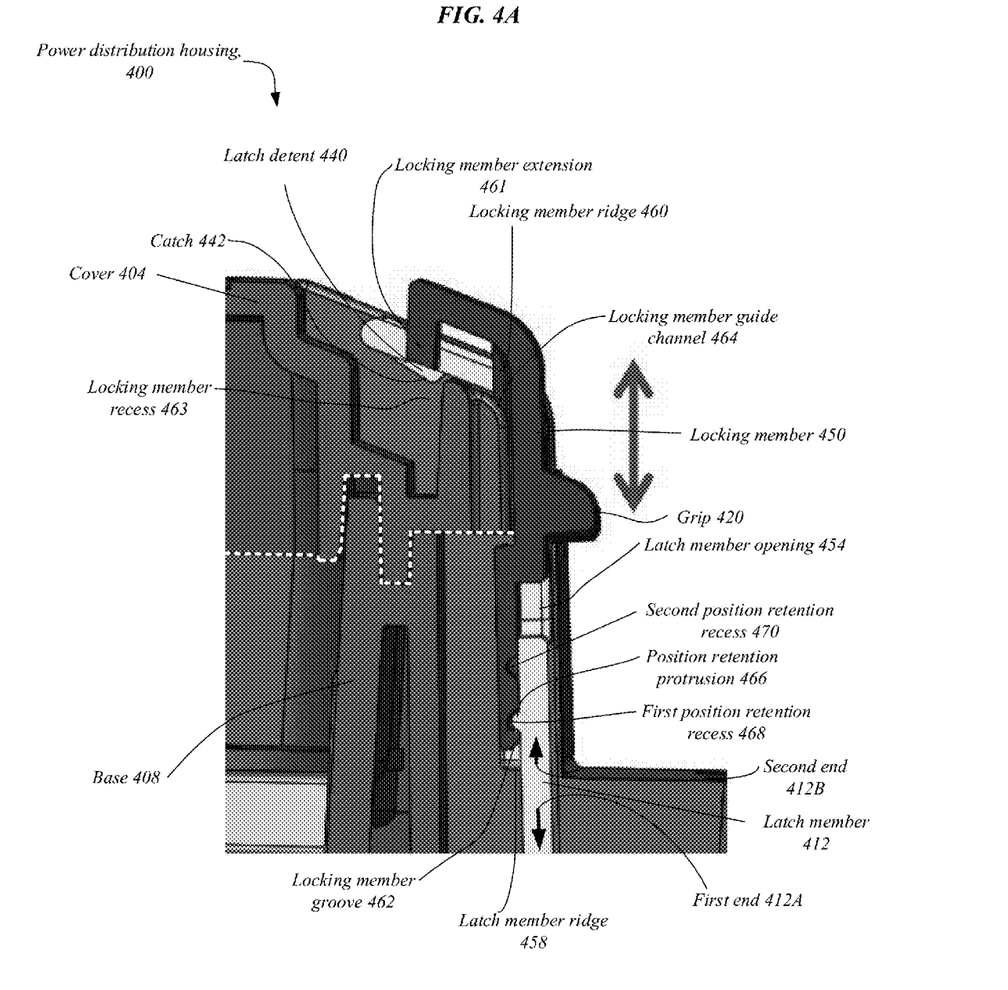
FIG. 4A is a side cut-through view of an exemplary power distribution housing in accordance with an embodiment of the present disclosure.

Referring now to FIG. 4A, a side cut-through view of a power distribution housing 400 consistent with a non-limiting, exemplary embodiment of the present disclosure is shown. The power distribution housing 400 may be similar to the power distribution housings 100, 200, 300 described above and may include a cover 404, a base 408, a latch member 412, and may further include a locking member 450. The cover 404 may be configured to fit over the base 408 in mating engagement therewith. The cover 404 can include a catch 442, a locking member recess 463, and a locking member guide channel 464. The catch 442 may receive a latch detent 440 on the latch member 412 to removably retain cover 404 to base 408. The locking member recess 463 may receive a locking member extension 461 on the locking member 450 to removably secure the cover 404 to the base 408. The locking member guide channel 464 may contact or be positioned around the locking member ridge 460 when the latch detent 440 is received by the catch 442. In various embodiments, latch member 412 may removably retain cover 404 to base 408 and locking member 450 may removably secure cover 404 to base 408. Embodiments are not limited in this context.

The latch member 412 can include a latch member opening 454. The latch member opening 454 may receive at least a portion of the locking member 450. The latch member ridge 458 may contact or be substantially surrounded by the locking member groove 462 when the locking member 450 is received by the latch member 412. The locking member 450 can be configured to move or slide between at least two positions relative to the latch member 412. The locking member 450 can be maintained in a first position when a position retention protrusion 466 is received by a first position retention recess 468. The locking member 450 can be maintained in a second position when the position retention protrusion 466 is received by a second position retention recess 470. In various embodiments, the first position may be an unlocked position and the second position may be a locked position. In various such embodiments, in the unlocked position, locking member extension 461 may not be received by locking member recess 463 (illustrated in FIG. 4A) and in the locked position, locking member extension 461 may be received by locking member recess 463. When locking member extension 461 is received by locking member recess 463, cover 404 may be removably secured to base 408.

The locking member 450 can include a grip 420 to enable a user to adjust the locking member 450 between the first and second positions without the use of tools. In some embodiments, grip 420 may provide leverage for moving the locking member 450 between the first and second positions. Not requiring the use of tools to secure/unsecure the cover 404 to/from the base 408 can allow easy removal of the cover 404 from the base 408 in the first position while still enabling robust retention of the cover 404 to the base 408 in the second position. In the illustrated embodiment, the first position can be an unlocked position 400B (See FIG. 4B) and the second position can be a locked position 400C (See FIG. 4C).

In various embodiments, the cover 404 and base 408 may be formed from a first material, the latch member 412 may be formed from a second material, and the locking member 450 may be formed from a third material. In various such embodiments, the second material may have a flexibility greater than the flexibility of the first and/or third materials. In some embodiments, one or more of the first, second, and third materials may be the same material. In various embodiments, latch member 412 and locking member 450 may be formed from a two shot molding process. In various embodiments, latch member 412 may have a curved geometry. In some embodiments, the materials may include, but are not limited to, various plastics, metals, composites, polymers, alloys, organic matter, or the like. The materials can be selected to achieve desired properties including rigidity, durability, resilience, electrical insulation, and the like.

Figure 4B:
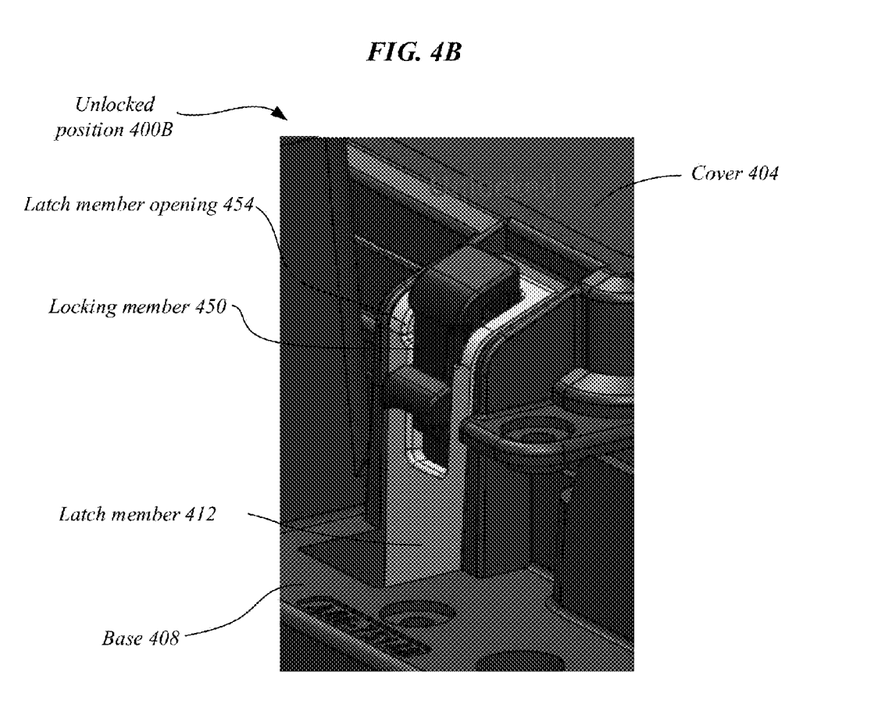
FIG. 4B is an isometric view of the exemplary power distribution housing of FIG. 4A in an unlocked position in accordance with an embodiment of the present disclosure.

Referring now to FIG. 4B, the power distribution housing 400 in the unlocked position 400B consistent with a non-limiting, exemplary embodiment of the present disclosure is shown. In the unlocked position 400B the locking member 450 may be received by the latch member opening 454. In some embodiments, in the unlocked position 400B the locking member 450 may protrude out of the latch member opening 454. In the unlocked position 400B, the locking member 450 may be located such that the locking member 450 is unable to prevent the latch member 412 from pivoting relative to the base 408. For example, locking member extension 461 may not be received by locking member recess 463. The latch member 412 can retain contact with the cover 404, thereby connecting the base 408 to the cover 404. In unlocked position 400B the latch member 412 may maintain contact between the cover 404 and the base 408. However, the unlocked position 400B may not completely protect the contents of the power distribution housing 400 from adverse environments because the cover 404 is not secured to the base 408 in the unlocked position 400B.

Figure 4C:
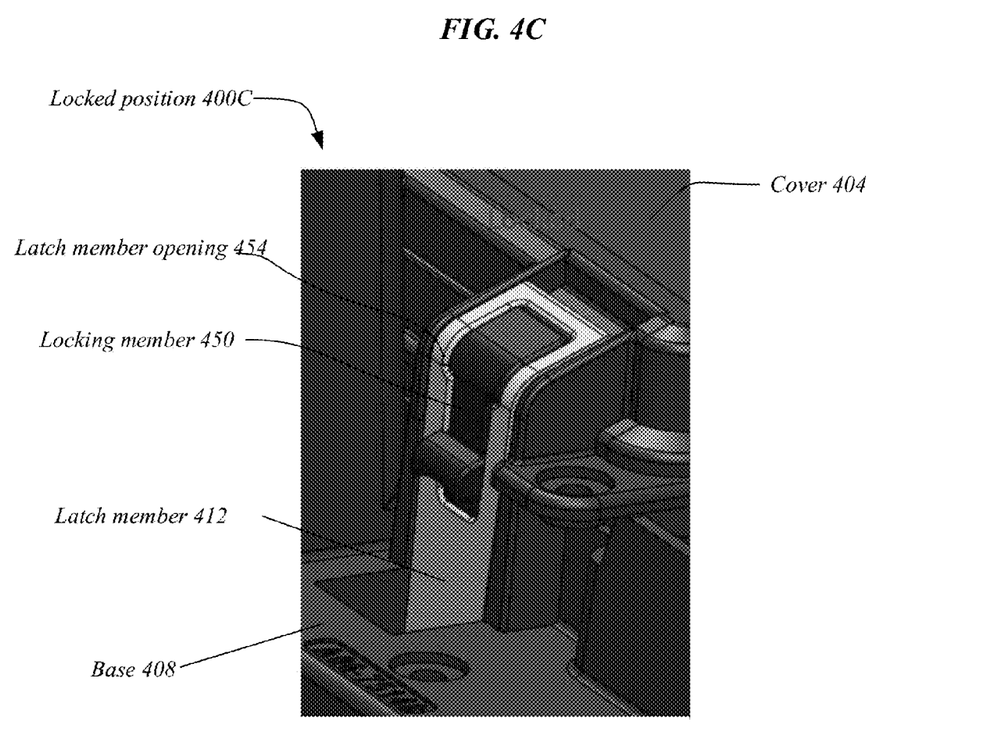
FIG. 4C is an isometric view of the exemplary power distribution housing of FIG. 4A in a locked position in accordance with an embodiment of the present disclosure.

Referring now to FIG. 4C, the power distribution housing 400 in the locked position 400C consistent with a non-limiting, exemplary embodiment of the present disclosure is shown. In the locked position 400C the locking member 450 may be received by the latch member opening 454. In some embodiments, the locking member 450 may be flush with or below the latch member opening 454 in the locked position 400C. In other embodiments, the locking member 450, in the locked position 400C, may protrude out of the latch member opening 454 an amount less than when the power distribution housing 400 is in the unlocked position 400B. In the locked position 400C, the locking member 450 may be located such that the locking member 450 is able to prevent the latch member 412 from pivoting relative to the base 408. For example, locking member extension 461 may be received by locking member recess 463. In the locked position 400C, the latch member 412 and the locking member 450 can secure the cover 404 to the base 408. When the cover 404 is secured to the base 408 by the latch member 412 and the locking member 450 the interior of the power distribution housing 400 can be protected from adverse environments exterior to the power distribution housing 400.

Providing unlocked and locked positions 400B, 400C may allow a user to ensure the cover 404 is properly aligned and/or received by the base 408 prior to securing the cover 404 to the base 408. Ensuring the cover 404 is properly aligned and/or received by the base 408 can enable a user to readily discern whether the power distribution housing 400 is properly assembled to protect contents of the power distribution housing 400 from adverse environmental conditions.

It will be appreciated that while components of the power distribution housing 400 can molded or formed in the manners described above, other methods of forming components of the power distribution housing 400 can additionally or alternatively be implemented. It is further contemplated that one or more components of power distribution housings 100, 200, 300 described above can be molded or formed from one or more materials without departing from the present disclosure.

It will be appreciated that while the illustrated embodiment of the power distribution housing 400 can be locked, unlocked, and maintained in the locked or unlocked positions in the manners described above, other arrangements of locking, unlocking, and maintaining the locked and/or unlocked positions of the power distribution housing 400 can additionally or alternatively be implemented. For example, a spring may bias the locking member 450 in the unlocked position 400a and a clip or latch may retain the locking member 450 in the locked position 400C. It is further contemplated that one or more components of power distribution housings 100, 200, 300, 400 may be assembled from a plurality of discrete components without departing from the present disclosure.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A power distribution housing comprising:
a base;
a cover adapted to fit onto the base;
a latch member adapted to removably secure the cover to the base, the latch member having a first end pivotably connected to the base and a second end having a latch detent extending therefrom, the latch detent configured to securely engage a catch formed in the cover when the latch member is pivoted to a latched position in which the cover is secured to the base by the latch member; and
a locking member slidably coupled to the latch member, the locking member movable between a locked position, in which a locking member extension of the locking member engages a locking member recess in the cover and prevents the latch member from being moved from the latched position to an unlatched position, and an unlocked position in which the locking member extension does not engage the locking member recess in the cover.

2. The power distribution housing of claim 1, wherein the latch member is a first latch member pivotably connected to a first side of the base and wherein the power distribution housing further comprises a second latch member adapted to removably secure the cover to the base, the second latch member having a first end pivotably connected to the second side of the base opposite the first side and having a second end having a latch detent extending therefrom, the latch detent configured to securely engage a catch formed in the cover when the latch member is pivoted to a latched position in which the cover is secured to the base by the second latch member.

3. The power distribution housing of claim 1, the latch member having a grip proximate the second end for facilitating convenient removal of the latch detent from the catch.

4. The power distribution housing of claim 3, wherein the grip and the cover are configured to define a relief therebetween when the latch member is in the latched position.

5. The power distribution housing of claim 1, wherein the latch member extends over a top of the cover when the latch member is in the latched position.

6. The power distribution housing of claim 1, wherein the cover and the base are formed from a first material and at least a portion of the latch member is formed from a second material that is different from the first material.

7. The power distribution housing of claim 1, wherein the latch detent engages the catch in a snap fit relationship therewith when the latch member is in the latched position.

8. The power distribution housing of claim 1, wherein the cover includes a cover ridge extending therefrom that is adapted to matingly engage a base groove formed in the base for achieving a predetermined alignment between the cover and the base when the cover is fit onto the base.

9. The power distribution housing of claim 1, further comprising a sealing member disposed between cover and the base.

10. The power distribution housing of claim 1, wherein the latch member includes a retention protrusion extending therefrom and the locking member includes a first position retention recess and a second position retention recess formed therein, wherein the retention protrusion is adapted to engage one of the first position retention recess and the second position retention recess to removably secure the locking member in the locked position and the unlocked position, respectively.

11. A power distribution housing comprising:
a base;
a cover adapted to fit onto the base;
a latch member adapted to removably secure the cover to the base, the latch member having a first end pivotably connected to the base and a second end having a latch detent extending therefrom, the latch detent configured to securely engage a catch formed in the cover when the latch member is pivoted to a latched position in which the cover is secured to the base by the latch member; and
a locking member slidably coupled to the latch member, the locking member movable between a locked position, in which a locking member extension of the locking member engages a locking member recess in the cover and prevents the latch member from being moved from the latched position to an unlatched position, and an unlocked position in which the locking member extension does not engage the locking member recess in the cover.

12. The power distribution housing of claim 11, wherein the latch member includes a retention protrusion extending therefrom and the locking member includes a first position retention recess and a second position retention recess formed therein, wherein the retention protrusion is adapted to engage one of the first position retention recess and the second position retention recess to removably secure the locking member in the locked position and the unlocked position, respectively.

13. The power distribution housing of claim 11, wherein the latch member is a first latch member pivotably connected to a first side of the base and wherein the power distribution housing further comprises a second latch member adapted to removably secure the cover to the base, the second latch member having a first end pivotably connected to the second side of the base opposite the first side and having a second end having a latch detent extending therefrom, the latch detent configured to securely engage a catch formed in the cover when the latch member is pivoted to a latched position in which the cover is secured to the base by the second latch member.

14. The power distribution housing of claim 11, the latch member having a grip proximate the second end for facilitating convenient removal of the latch detent from the catch.

15. The power distribution housing of claim 11, wherein the grip and the cover are configured to define a relief therebetween when the latch member is in the latched position.

16. The power distribution housing of claim 11, wherein the latch member extends over a top of the cover when the latch member is in the latched position.

17. The power distribution housing of claim 11, wherein the cover and the base are formed from a first material and at least a portion of the latch member is formed from a second material that is different from the first material.

18. The power distribution housing of claim 11, wherein the latch detent engages the catch in a snap fit relationship therewith when the latch member is in the latched position.

19. The power distribution housing of claim 11, wherein the cover includes a cover ridge extending therefrom that is adapted to matingly engage a base groove formed in the base for achieving a predetermined alignment between the cover and the base when the cover is fit onto the base.

20. The power distribution housing of claim 11, further comprising a sealing member disposed between cover and the base.

\* \* \* \* \*